United States Patent
Dupoiron et al.

(10) Patent No.: US 10,783,658 B2
(45) Date of Patent: Sep. 22, 2020

(54) IMAGE PROCESSING METHOD

(71) Applicant: Commissariat à l'Energie Atomique et aux Energies Alternatives, Paris (FR)

(72) Inventors: Camille Dupoiron, Grenoble (FR); William Guicquero, Bures-sur-Yvette (FR); Gilles Sicard, Crolles (FR); Arnaud Verdant, Saint-Nazaire-les-Eymes (FR)

(73) Assignee: COMMISSARIAT À L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 155 days.

(21) Appl. No.: 16/031,085

(22) Filed: Jul. 10, 2018

(65) Prior Publication Data

US 2019/0019307 A1    Jan. 17, 2019

(30) Foreign Application Priority Data

Jul. 11, 2017  (FR) ...................... 17 56555

(51) Int. Cl.
*G06K 9/00*   (2006.01)
*G06T 7/73*   (2017.01)
(Continued)

(52) U.S. Cl.
CPC .............. *G06T 7/73* (2017.01); *G06K 9/4642* (2013.01); *G06T 7/90* (2017.01); *G06K 2009/4666* (2013.01)

(58) Field of Classification Search
CPC ..... G06T 7/73; G06T 7/90; G06T 7/11; G06T 7/194; G06T 7/44; G06T 7/13; G06T 7/246; G06T 7/269; G06T 7/33; G06T 7/337; G06T 2207/10016; G06T 2207/30196; G06T 2207/20021; G06T 2207/20081; G06T 2207/20112; G06K 2009/4666; G06K 2009/21; G06K 2009/485;
(Continued)

(56) References Cited

U.S. PATENT DOCUMENTS 9,639,777 B1 *  5/2017  Moloney ............... G06K 9/4647
10,366,277 B2 *  7/2019  Friedland ........... G06K 9/00261
(Continued)

OTHER PUBLICATIONS

Preliminary Search Report in French Patent Application No. 1756555 dated Mar. 14, 2018, 2 pages.
(Continued)

*Primary Examiner* — Jose L Couso
(74) *Attorney, Agent, or Firm* — Moreno IP Law LLC (57) ABSTRACT

A method of processing an image including pixels distributed in cells and in blocks is disclosed, the method including the steps of: a) for each cell, generating n first intensity values of gradients having different orientations, each first value being a weighted sum of the values of the pixels of the cell; b) for each cell, determining a main gradient orientation of the cell and a second value representative of the intensity of the gradient in the main orientation; c) for each block, generating a descriptor of n values respectively corresponding, for each of the n gradient orientations, to the sum of the second values of the cells of the block having the gradient orientation considered as the main gradient orientation.

14 Claims, 3 Drawing Sheets

(51) Int. Cl.
*G06T 7/90* (2017.01)
*G06K 9/46* (2006.01)

(58) Field of Classification Search
CPC .... G06K 9/4662; G06K 9/00281; G06K 9/56; G06K 9/4671; G06K 9/4647; G06K 9/00771; G06K 9/4604; G06K 9/42; G06K 9/3241; G06K 9/00369; G06K 9/0014; G06K 9/00147; G06K 9/00268; G06K 9/00208; G06K 9/0061; G06K 9/00617; G06K 9/00711; G06K 9/4609; G06K 9/481; G06K 9/6212; G06K 9/6267; G06K 9/00201; G06F 17/15; G06F 17/18
See application file for complete search history.

(56) References Cited

U.S. PATENT DOCUMENTS

| | | | | |
|---|---|---|---|---|
| 2010/0080469 A1* | 4/2010 | Liu | ....... | G06K 9/4671 382/201 |
| 2010/0111416 A1* | 5/2010 | Meiers | ....... | G06K 9/4642 382/170 |
| 2012/0099796 A1* | 4/2012 | Zitnick, III | ....... | G06K 9/4642 382/199 |
| 2012/0121189 A1* | 5/2012 | Ishii | ....... | G06K 9/4671 382/197 |
| 2012/0134586 A1* | 5/2012 | Pajaniradja | ....... | G06K 9/00986 382/170 |
| 2013/0058535 A1* | 3/2013 | Othmezouri | ....... | G06K 9/00369 382/103 |
| 2013/0163870 A1 | 6/2013 | Cao et al. | | |
| 2015/0092982 A1 | 4/2015 | Kang et al. | | |
| 2016/0148071 A1* | 5/2016 | Desappan | ....... | G06K 9/4647 382/103 |
| 2016/0225119 A1* | 8/2016 | Xu | ....... | G06T 1/20 |
| 2017/0243084 A1* | 8/2017 | Soatto | ....... | G06K 9/6267 |
| 2018/0122079 A1* | 5/2018 | Srinivasan | ....... | G06K 9/4642 |
| 2019/0095748 A1* | 3/2019 | Gan | ....... | G06K 9/4647 |

OTHER PUBLICATIONS

Le Hir, et al., "Distributed Mixed-Signal Architecture for Programmable Smart Image Sensors," 15th IEEE Intl. New Circuits and Systems Conference (NEWCAS), Jun. 25, 2017, pp. 353-356.
Lai, et al., "A Review of Pedestrian Detection Techniques Based on Histogram of Oriented Gradient Feature," IEEE Student Conference on Research and Development, Dec. 16, 2014, pp. 1-6.
Alahi, et al., "FREAK: Fast Retina Keypoint," IEEE Conference on Computer Vision and Pattern Recognition, Jun. 16, 2012, pp. 510-517.
Calonder, et al., "BRIEF: Binary Robust Independent Elementary Features," European Conference on Computer Vision, 2010, pp. 778-792.
Dalal, et al., "Histograms of Oriented Gradients for Human Detection," 2005 IEEE Computer Society Conference on Computer Vision and Pattern Recognition (CVPR'05), Jun. 20, 2005, 8 pages.
Leutenegger, et al., "BRISK: Binary Robust Invariant Scalable Keypoints," 2011 International Conference on Computer Vision, Nov. 6, 2011, 8 pages.
Rublee, et al., "ORB: an efficient alternative to SIFT or SURF," 2011 International Conference on Computer Vision, Nov. 6, 2011, 8 pages.

* cited by examiner

| 1 | 1 | 1 |
| 0 | 1 | 0 |
| 0 | 0 | 0 |

| 1 | 0 | 0 |
| 1 | 1 | 0 |
| 1 | 0 | 0 |

| 0 | 0 | 0 |
| 0 | 1 | 0 |
| 1 | 1 | 1 |

| 0 | 0 | 1 |
| 0 | 1 | 1 |
| 0 | 0 | 1 |

G5(NE) G6(NO) G7(SO) G8(SE)

| 0 | 1 | 1 |
| 0 | 1 | 1 |
| 0 | 0 | 0 |

| 1 | 1 | 0 |
| 1 | 1 | 0 |
| 0 | 0 | 0 |

| 0 | 0 | 0 |
| 1 | 1 | 0 |
| 1 | 1 | 0 |

| 0 | 0 | 0 |
| 0 | 1 | 1 |
| 0 | 1 | 1 |

| 1/3 | 1/3 | 1/3 |
| 0 | 1/8 | 0 |
| 0 | 0 | 0 |

| 1/3 | 0 | 0 |
| 1/3 | 1/8 | 0 |
| 1/3 | 0 | 0 |

| 0 | 0 | 0 |
| 0 | 1/8 | 0 |
| 1/3 | 1/3 | 1/3 |

| 0 | 0 | 1/3 |
| 0 | 1/8 | 1/3 |
| 0 | 0 | 1/3 |

G5(NE) G6(NO) G7(SO) G8(SE)

| 0 | 1/3 | 1/3 |
| 0 | 1/8 | 1/3 |
| 0 | 0 | 0 |

| 1/3 | 1/3 | 0 |
| 1/3 | 1/8 | 0 |
| 0 | 0 | 0 |

| 0 | 0 | 0 |
| 1/3 | 1/8 | 0 |
| 1/3 | 1/3 | 0 |

| 0 | 0 | 0 |
| 0 | 1/8 | 1/3 |
| 0 | 1/3 | 1/3 |

IMAGE PROCESSING METHOD

CROSS-REFERENCE TO RELATED APPLICATION

This application claims the priority benefit of French patent application number FR17/56555, the content of which is hereby incorporated by reference in its entirety to the maximum extent allowable by law.

FIELD

The present disclosure concerns a method of processing an image by means of an electronic processing device, and a system comprising an image sensor and a processing device capable of implementing this method.

BACKGROUND

In many applications, it is needed to analyze in automated fashion images acquired by an image sensor, to detect the presence of predefined characteristic elements in a scene seen by the sensor.

Various analysis methods have been provided. In particular, analysis methods based on the generation of descriptors allowing a compact representation of the image, while preserving the useful information for the considered application, have been provided.

As an example, the article entitled "Histograms of oriented gradients for human detection", of N. Dalal and B. Triggs (IEEE Computer Society Conference on Computer Vision and Pattern Recognition (CVPR'05), 2005, vol. 1, pp. 886-893), describes an analysis method based on the generation of descriptors constructed based on histograms of gradients in different orientations. Such a method has a particularly high performance, particularly for people-tracking applications, but has the disadvantage that the generation of descriptors requires relatively heavy calculations, which results in a relatively high power consumption of the processing device.

Other analysis methods based on other types of descriptors have been provided, particularly in the article entitled "ORB: An efficient alternative to SIFT or SURF", de E. Rublee, V. Rabaud, K. Konolige, and G. Bradski (International conference on computer vision, 2011, pp. 2564-2571), in the article entitled "Brief: Binary robust independent elementary features", of M. Calonder, V. Lepetit, C. Strecha, and P. Fua (European conference on computer vision, 2010, pp. 778-792), in the article entitled "Freak: Fast retina keypoint", of A. Alahi, R. Ortiz, and P. Vandergheynst (IEEE conference on Computer vision and pattern recognition, 2012, pp. 510-517), and in the article entitled "BRISK: Binary robust invariant scalable keypoints", of S. Leutenegger, M. Chli, and R. Y. Siegwart (International conference on computer vision, 2011, pp. 2548-2555). Here again, although they have a good performance, such methods have the advantage of requiring relatively complex calculations to generate the descriptors.

It would be desirable to have a high-performance image analysis method, based on compact, robust descriptors, which are simpler to calculate than descriptors of known methods.

SUMMARY

Thus, an embodiment provides a method of processing, by means of an electronic device, an image comprising a plurality of pixels distributed into one or a plurality of blocks each comprising a plurality of cells of a plurality of pixels, the method comprising the steps of:

a) for each cell, generating n first intensity values of gradients having different orientations, each first gradient intensity value being a weighted sum of the values of the pixels of the cell;

b) for each cell, determining, based on the n first gradient intensity values calculated at step a), a main gradient orientation of the cell, and a second value representative of the intensity of the gradient in the main orientation; and c) for each block, generating a descriptor of n values respectively corresponding, for each of the n gradient orientations, to the sum of the second values of the cells of the block having the gradient orientation considered as the main gradient orientation.

According to an embodiment, step a) comprises an initial step of 1-bit quantization of the values of the pixels of the cell, each first gradient intensity value being a weighted sum of the 1-bit quantized values of the pixels of the cell.

According to an embodiment, at step a), during the initial step of 1-bit quantization of the values of the pixels, different quantization thresholds are used for different cells of the image.

According to an embodiment, at step a), for each cell, the quantization threshold used during the initial step of 1-bit quantization of the values of the pixels of the cell is a function of the maximum value of the pixel of the cell or of the block containing the cell.

According to an embodiment, at step a), the weighting coefficients used to generate the n first intensity values of gradients having different orientations of each cell are binary coefficients.

According to an embodiment, at step a), the weighting coefficients used to generate the n first different intensity values of gradients having different orientations of each cell are non-binary coefficients.

According to an embodiment, the n gradient orientations of step a) are separated two by two by a same angular distance.

According to an embodiment, at step b), the orientation for which the first gradient intensity value generated at step a) is maximum is selected as the main gradient orientation of the cell.

According to an embodiment, step b) comprises:

a step of generating a vector B resulting from a convolution operation between a vector A of dimension n formed by the n first gradient intensity values generated at step a) and a triangular signal; and a step of selecting, as a main gradient orientation of the cell, the orientation for which the value of vector B is maximum.

According to an embodiment, at step b), the second value representative of the intensity of the gradient of the cell in the main gradient orientation of the cell is weighted by a coefficient which is a function of the distribution of the values of the pixels of the cell.

Another embodiment provides a system comprising:

an image sensor comprising a plurality of pixels distributed into one or a plurality of blocks, each comprising a plurality of cells of a plurality of pixels; and a processing circuit capable of implementing, for each image acquired by the sensor, a processing method such as defined hereabove.

According to an embodiment, the image sensor is a time-domain coding sensor where each pixel comprises a photo-diode and a comparator comparing the voltage across the photo-diode with a reference voltage, each pixel being capable, during a phase of acquisition of an image, of turning on and generating a pulse when the voltage across its photodiode reaches the reference voltage.

According to an embodiment, the processing circuit comprises, for each block of pixels of the sensor, a circuit capable of, during a phase of acquisition of an image:

determining the time when a first pixel of the block turns on; and after a predefined inhibition period starting from this time, determining which pixels of the block have turned on and which pixels of the block have not turned on during the inhibition period.

The foregoing and other features and advantages will be discussed in detail in the following non-limiting description of specific embodiments in connection with the accompanying drawings.

DETAILED DESCRIPTION OF THE PRESENT EMBODIMENTS

The same elements have been designated with the same reference numerals in the various drawings and, further, the various drawings are not to scale. For clarity, only those steps and elements which are useful to the understanding of the described embodiments have been shown and are detailed. In particular, the forming of the inner circuits of the image sensors, and particularly of the pixels and of the peripheral control and readout circuits, has not been detailed, the provided processing method being compatible with all or most of known image sensor architectures. Further, the forming of processing circuits capable of implementing the described processing method has not been detailed, the forming of such circuits being within the abilities of those skilled in the art based on the functional indications of the present description, it being understood that the processing circuits may be either partially or totally integrated to the image sensor, or external to the image sensor.

Figure 1:
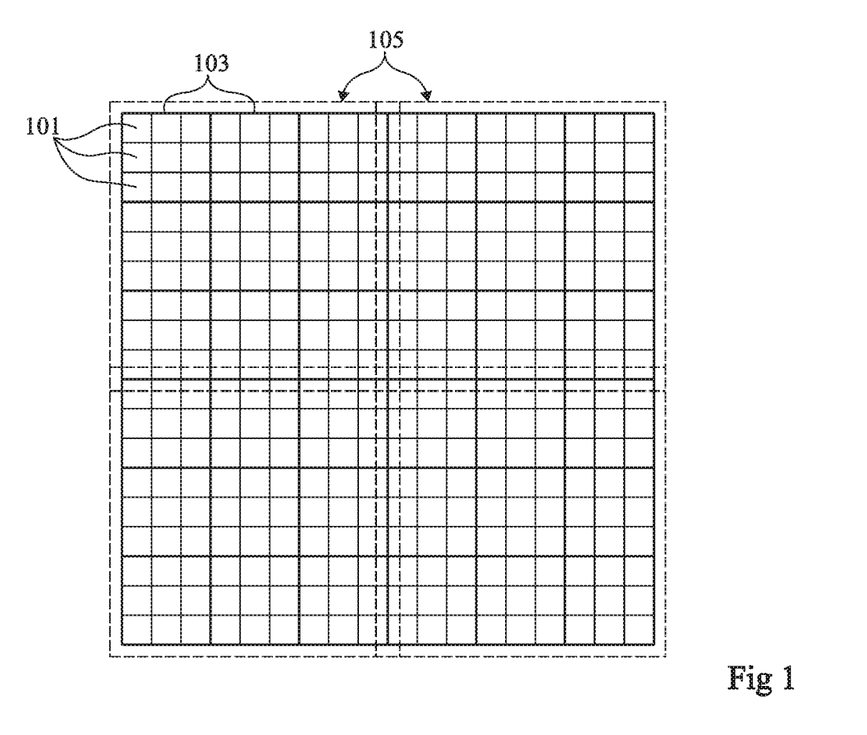
FIG. 1 is a very simplified representation of an example of an image sensor.

FIG. 1 is a very simplified representation of an example of an image sensor. The sensor of FIG. 1 comprises a plurality of pixels 101, for example identical or similar, arranged in an array of rows and columns. During an image acquisition phase, each pixel 101 supplies an output value representative of a luminosity level received by the pixel, the image being formed by all the output values of the sensor pixel. The pixels 101 of the sensor are distributed into a plurality of cells 103 of a plurality of pixels each. Cells 103 are for example identical or similar. In the shown example, each cell 103 corresponds to a sub-array of 3*3 neighboring pixels of the sensor and each pixel 101 belongs to a single cell 103 of the sensor. In the example of FIG. 1, and as will be explained in further detail hereafter, the cells are further distributed into a plurality of blocks 105 of a plurality of cells 103 each. In the following description, the pixels, cells, and cell blocks of the sensor and corresponding pixels, cells, and cell blocks of an image acquired by the sensor will be designated with the same reference numerals 101, 103, and 105.

Figure 2:
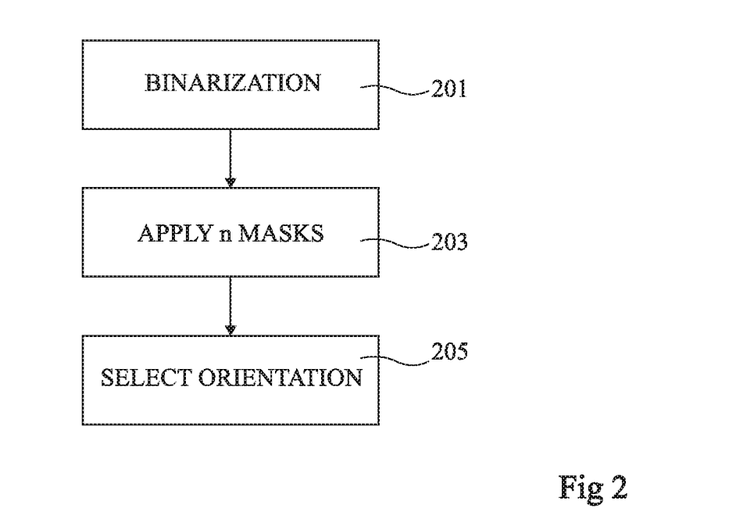
FIG. 2 is a timing diagram schematically illustrating steps of an embodiment of a method of processing an image acquired by means of the sensor of FIG. 1.

FIG. 2 is a flowchart schematically illustrating an embodiment of a method of processing an image acquired by the sensor of FIG. 1. FIG. 2 more particularly illustrates three steps of 201, 203, and 205 successively implemented for each of the image cells. According to the selected implementation type, the method of FIG. 2 may be simultaneously applied to all the cells of the image or to part of the cells of the image, or be sequentially applied to the different cells.

The method of FIG. 2 comprises a first step 201 (BINARIZATION) during which the value of each pixel of the cell in the initial image is 1-bit quantized or binarized. The quantization threshold may be common to all the pixels 101 of the image. As an example, the quantization threshold is common to all the image pixels and is set independently from the values of the image pixels. As a variation, the quantization threshold is common to all the pixels of the image and is set according to the value of at least one pixel in the image, for example, according to the value of the brightest pixel in the image. In a preferred embodiment, the quantization threshold is defined cell by cell, or cell block by cell block. For each cell or cell block, the quantization threshold may be selected according to the value of at least one pixel in the cell or in the cell block. As an example, for each pixel 101 in the image, the quantization threshold is selected according to the maximum value Vmax of the pixels of cell 103 or of the cell block 105 comprising the pixel, it being understood that the pixel values are all the higher as the pixels are bright, and conversely. As an example, for each cell 103 or cell block 105 of the image, the quantization threshold of the pixels of the cell or of the block is selected to be equal to Vmax−Δ, where Δ is a value which may be common to all the cells or to all the cell blocks of the image, or be itself a function of the maximum value Vmx of the considered cell 103 or cell block 105. As an example, for each cell or cell block, value Δ is equal to X*Vmax, where X is a coefficient between 0 and 1, which may be common to all the cells or to all the cell blocks of the image.

An advantage of providing, for each pixel 101, a quantization threshold selected according to the maximum value Vmax of the pixels of the cell 103 or of a cell block comprising the pixel, is that this enables to locally adapt the threshold according to the local luminosity level. In particular, this enables to pre-establish a normalization of the future descriptors generated for the image. In the case of a non-linear quantization of the pixels (time-domain coding, for example), the local adaptation of the threshold enables to define more homogeneous inhibition time periods.

At the end of step 201, a binary value having a first level, for example, value 0, if the value of the corresponding pixel in the original image is smaller than the quantization threshold of the pixel, and having a second level, for example, value 1, if the value of the corresponding pixel in the original image is greater than the quantization threshold, have been associated with each pixel of the cell.

The method of FIG. 2 further comprises a second step 203 (APPLY n MASKS) during which, for the considered cell, a series of n intensity values VG1, . . . VGn of gradients having different orientations are calculated, where n is an integer greater than or equal to 2.

Each of the gradient intensity values VG1, . . . VGn is the result of a weighted sum of the binary values (calculated during step 201) of the cell pixels. The n sets of weighting coefficients G1, . . . Gn, called masks, used to respectively calculate the n gradient intensity values VG1, . . . VGn, define the respective orientations of the n considered gradients.

Figure 3A:
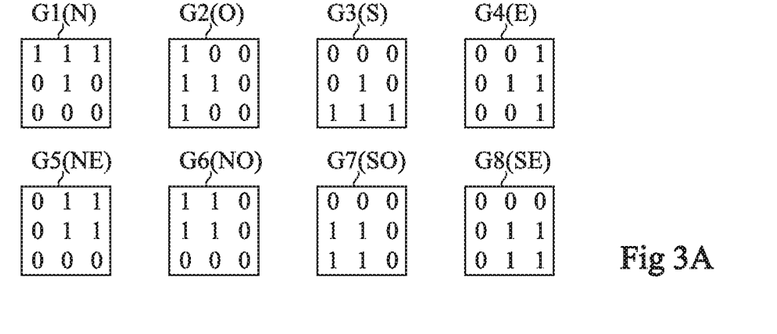
FIGS. 3A and 3B illustrate in further detail examples of implementation of a step of calculating values of gradients of the method of FIG. 2.

FIG. 3A illustrates, as an example, a set of n=8 sets of weighting coefficients or masks G1, G2, G4, G5, G6, G7, and G8, which may be used to calculate, for each cell 103, 8 intensity values VG1, VG2, VG3, VG4, VG5, VG6, VG7, and VG8 of gradients having different orientations. A configuration of the type illustrated in FIG. 1 is here considered, where each cell 103 corresponds to a sub-array of 3*3 pixels of the image. Each set of weighting coefficients thus comprises 3*3 coefficients, shown in FIG. 3A in the form of an array having the same orientation as a cell 103 of the sensor of FIG. 1. In this example, the gradient orientations defined by masks G1, . . . G8 are separated two by two by a same angular distance in the order of $\pi/4$. Further, in this example, the weighting coefficients are binary coefficients.

In mask G1, the weighting coefficients associated with the pixels of the first row of cell 103 as well as with the central pixel of the cell have value 1, and the other weighting coefficients have value 0.

In mask G2, the weighting coefficients associated with the pixels of the first column of cell 103 as well as with the central pixel of the cell have value 1, and the other weighting coefficients have value 0.

In mask G3, the weighting coefficients associated with the pixels of the last row of cell 103 as well as with the central pixel of the cell have value 1, and the other weighting coefficients have value 0.

In mask G4, the weighting coefficients associated with the pixels of the last column of cell 103 as well as with the central pixel of the cell have value 1, and the other weighting coefficients have value 0.

In mask G5, the weighting coefficients associated with the pixels of the first column and of the last row of cell 103 have value 0, and the other weighting coefficients have value 1.

In mask G6, the weighting coefficients associated with the pixels of the last column and of the last row of cell 103 have value 0, and the other weighting coefficients have value 1.

In mask G7, the weighting coefficients associated with the pixels of the first row and of the last column of cell 103 have value 0, and the other weighting coefficients have value 1.

In mask G8, the weighting coefficients associated with the pixels of the first row and of the first column of cell 103 have value 0, and the other weighting coefficients have value 1.

In the orientation of FIG. 3A, masks G1, G2, G3, G4, G5, G6, G7, and G8 respectively correspond to gradients having a north (N), west (O), south (S), east (E), north-east (NE), north-west (NO), south-west (SO), and south-east (SE) orientations.

It should be noted that the described embodiments are not limited to the examples of mask patterns shown in FIG. 3A, nor to number n=8 of different gradient orientations considered in the example of FIG. 3A. Preferably, the gradient orientations defined by masks G1, . . . Gn are separated two by two by a same $2\pi/n$ angular distance.

Further, the weighting coefficients applied to calculate the n gradient intensity values VG1, . . . VGn are not necessarily binary.

Figure 3B:
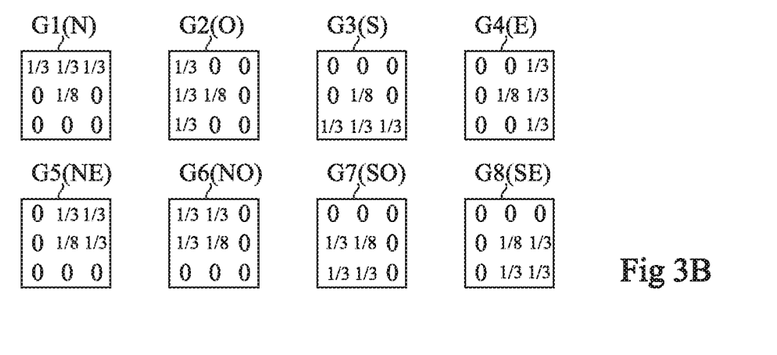

FIG. 3B illustrates another example of a set of n=8 sets of weighting coefficients or masks G1, G2, G3, G4, G5, G6, G7, and G8, which may be used to calculate, for each cell 103, 8 values VG1, VG2, VG3, VG4, VG5, VG6, VG7, and VG8 of gradients having different orientations.

The masks of FIG. 3B differ from the masks of FIG. 3A in that, in the example of FIG. 3B, the weighting coefficients are non-binary coefficients. More particularly, in the example of FIG. 3B, each of masks G1, G2, G3, G4, G5, G6, G7, and G8 is obtained by multiplying each weighting coefficient of the corresponding mask of FIG. 3A by the inverse of the number of masks where the considered coefficient is non-zero. Thus, in each of masks G1, G2, G3, G4, G5, G6, G07, and G08, the weighting coefficient associated with the central pixel of the cell has value ⅛. In mask G1, the weighting coefficients associated with the pixels of the first row of the cell have value ⅓. In mask G2, the weighting coefficients associated with the pixels of the first column of the cell have value ⅓. In mask G3, the weighting coefficients associated with the pixels of the last row of the cell have value ⅓. In mask G4, the weighting coefficients associated with the pixels of the last column of the cell have value ⅓. In mask G5, the weighting coefficients associated with the three pixels of the upper right corner of the cell have value ⅓. In mask G6, the weighting coefficients associated with the three pixels of the upper left corner of the cell have value ⅓. In mask G7, the weighting coefficients associated with the three pixels of the lower left corner of the cell have value ⅓. In mask G8, the weighting coefficients associated with the three pixels of the lower right corner of the cell have value ⅓. In each mask, the weighting coefficients associated with the other pixels have value 0. An advantage of the mask selection of FIG. 3B is that it enables to pre-establish a normalization of the future descriptor(s) generated to depict the image. As a variation, the weighting applied to the coefficients of each mask may vary according to the considered cell 103 or to the considered cell block 105.

At the end of step 203, one has, for the considered cell (after n additions of the binary values of the pixels respectively weighted by the corresponding coefficients of the n masks G1, . . . Gn), a series of n intensity values of gradients having different orientations VG1, . . . VGn.

For more robustness, one may, as a variation, discard from this process pixels having a flickering binary value, that is, a value which changes state between two successive image acquisition phases. Indeed, for pixels having an illumination level close to the quantization threshold, the time-domain noise may result in a flickering of the binary value of the pixel, which may result in varying the main gradient orientation of the considered block. The suppression of the flickering pixels by an appropriate filtering enables to make processings associated with the calculated vectors more robust. As a variation, a filtering may be provide to eliminate from the processing gradients having a main orientation which varies recurrently, for example, by $\pi/2$ or by $\pi/4$ over a plurality of successive frames.

The method of FIG. 2 further comprises a step 205 (SELECT ORIENTATION) during which, for the considered cell, a main gradient orientation OP of the cell, as well as a value VOP representative of the intensity of the cell gradient in this main orientation, based on the n gradient intensity values VG1, . . . VGn calculated at step 203, are determined.

As an example, during this step, it is determined which gradient orientation Gi has the highest intensity VGi from among the n gradient orientations G1, . . . On considered at the previous step (i being an integer in the range from 1 to n). Orientation Gi is then selected as the main gradient orientation OP of the cell, and the cell is assigned gradient intensity value VOP=VGi. Such a method of selecting the main gradient orientation has the advantage of being particularly simple to implement. However, a disadvantage is that conflicts may arise when, for a same cell 103, a plurality of gradient orientations have a same maximum value. This is illustrated in FIGS. 4A and 4B.

Figure 4A:
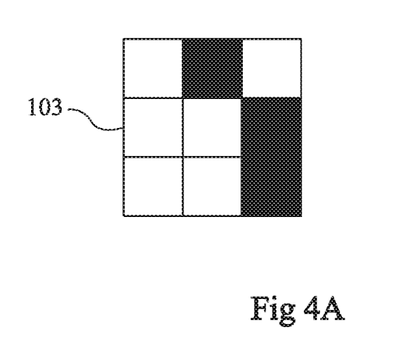
FIGS. 4A, 4B, and 5 illustrate in further detail examples of implementation of a step of selection of a main gradient orientation of the method of FIG. 2.

FIG. 4A shows the binary values of the pixels of a cell 103 of the image to be analyzed, determined at step 201. Pixels having value 1 are shown in black in the drawing, and pixels having value 0 are shown in white.

Figure 4B:
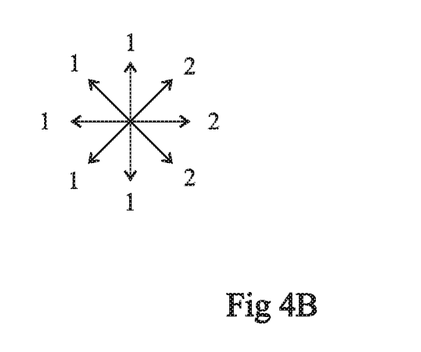

FIG. 4B shows, for this same cell 103, the 8 intensity values of gradients having different orientations calculated at step 203 based on the masks of FIG. 3A. As shown in FIG. 4B, the gradient intensity values for the north, north-west, west, south-west, and south orientations are equal to 1, and the gradient intensity values for the north-east, east, and south-east orientations are equal to 2.

There thus is a conflict between the north-east (G5), east (G4), and south-east (G8) orientations to determine the main orientation.

Figure 5:
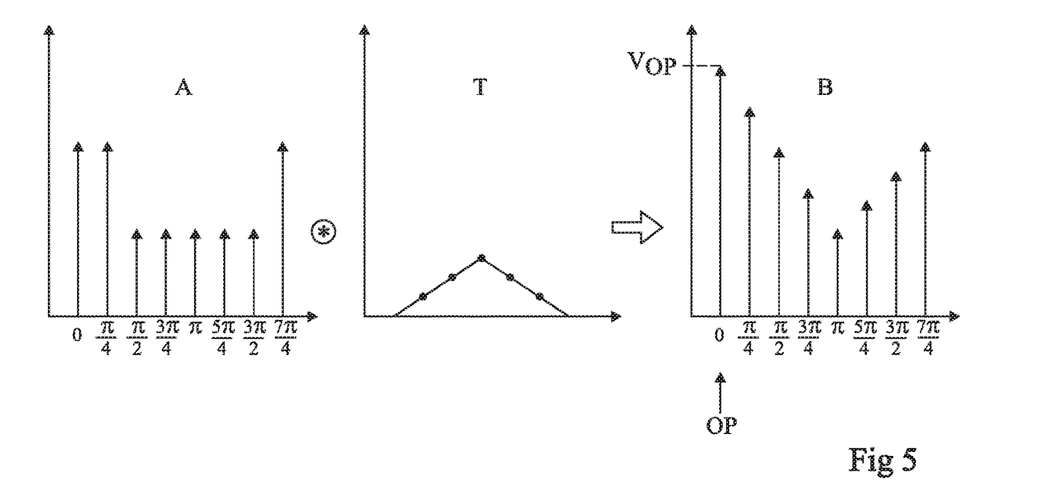

FIG. 5 illustrates another example of a method of selecting the main gradient orientation OP of the cell, which enables to solve such conflicts.

In the example of FIG. 5, an operation of convolution between a vector A of dimension n formed by the n gradient intensity values VG1, . . . VGn calculated at step 203 and a triangular signal T, for example, of dimension (n/2)+1, is carried out.

An example of vector A of dimension n=8 formed by the gradient intensity values of the example of FIG. 4B is shown in the left-hand portion of FIG. 5, and an example of triangular signal T is shown in the central portion of FIG. 5. The right-hand portion of FIG. 5 shows the result of the convolution, that is, a vector B of dimension n.

Once vector B has been generated, the maximum value B[Gi] of vector B is determined. Orientation Gi is then selected as being the main gradient orientation OP of the cell and the cell is assigned gradient intensity value VOP=B[Gi] (where B[Gi] is the value of vector B for angular orientation Gi).

More generally, any other method may be used at step 205 to determine, based on the n gradient intensity values VG1, . . . VGn determined at step 203, the main gradient orientation OP of the cell as well as a value VOP representative of the intensity of the gradient of the cell in the main orientation.

Further, the value VOP assigned to the cell may be weighted according to the distribution of the binary values of the cell pixels, for example, to favor distributions where approximately half of the pixels are at value 1 and the other half of the pixels are at value 0. Indeed, the gradient information in these cells is generally more relevant than the same gradient information in cells where most pixels are at value 0 or at value 1.

As an example, for each cell, value VOP may be weighted by a coefficient cp defined as follows:

$$cp = \frac{nbpix\_cell}{2} - \left| \frac{nbpix\_cell}{2} - \sum_{nbpix} pix = 1 \right|$$

where nbpix_cell designates the number of pixels in the cell, and where operator $\sum_{nbpix} pix=1$ designates the number of pixels having binary value 1 in the cell.

Figure 6:
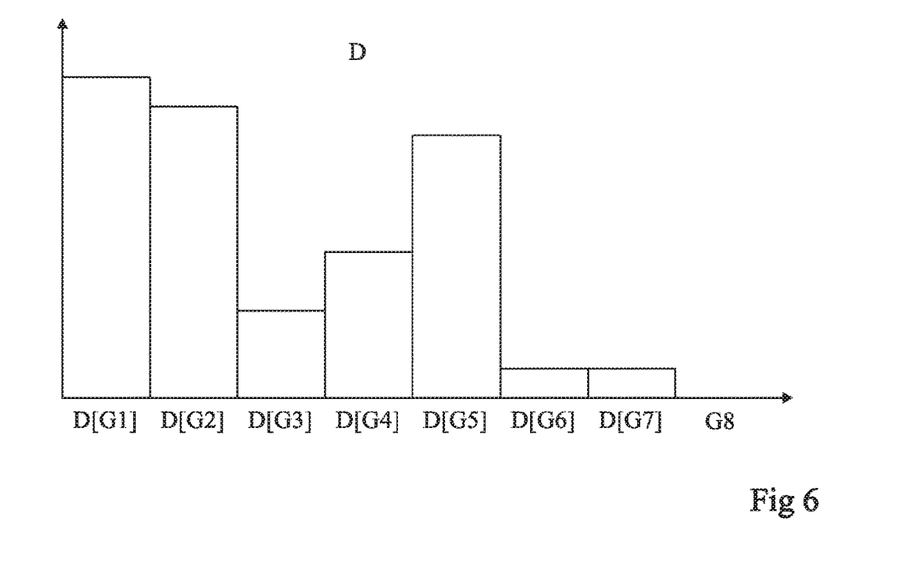
FIG. 6 illustrates a step of calculation of a descriptor of an image or of a portion of an image, according to an embodiment of a method of processing an image acquired by means of the sensor of FIG. 1.

FIG. 6 illustrates a step of generation of a descriptor D of an image or of a portion of an image acquired by means of the sensor of FIG. 1. As an example, and as illustrated in FIG. 1, the cells 103 of the image are distributed into a plurality of blocks 105 of a plurality of cells 103 each. The step of FIG. 6 may then be repeated for each block 105, to generate one descriptor D per block. Blocks 105 are for example identical or similar. In the example of FIG. 1, each block 105 corresponds to a sub-array of 3*3 neighboring cells 103 of the sensor (that is, 9*9 neighboring pixels 101). As an example, each cell 103 belongs to a single block 105 of the sensor, as illustrated in FIG. 1. As a variation, blocks 105 may overlap, that is, each cell may belong to a plurality of different blocks 105 to perform an analysis which is more robust against detection errors. As a variation, a single block 105 including all the sensor cells 103 is defined, in which case a single descriptor D of the image is generated at the step of FIG. 6.

For each block 105 of the image, descriptor D generated at the step of FIG. 6 is formed of a vector of dimension n. Descriptor D is illustrated in the form of a histogram in FIG. 6. It comprises, for each of the n gradient orientations G1, . . . Gn considered at step 203 of the method of FIG. 2, a value D[Gi], equal to the sum of the values VOP of the block cells having orientation Gi as a main gradient orientation OP.

Based on the descriptor(s) D of the image thus generated, various applications of automated analysis of images may be implemented, particularly by using known methods based on a training from previously acquired reference images, for example SVM-type ("Support Vector Machine") methods.

An advantage of the descriptors D generated by the above-described method is that they both have a high performance for usual image analysis applications, particularly for people-tracking applications, and are particularly simple to calculate.

The above-described descriptor generation method may be entirely implemented by processing circuits external to the image sensor.

However, preferentially, all or part of this method is implemented within the image sensor itself, which enables to decrease the general electric power consumption of the analysis system by limiting transfers of complete images between the sensor and external processing circuits.

In particular, different known image sensor architectures may be adapted to implement, within the sensor, and particularly upstream of the analog-to-digital conversion circuits of the sensor, at least some of the steps of the above-described method.

The above-described descriptor generation method is particularly well adapted for an implementation in a sensor with a time-domain coding of the data, that is, a sensor where each pixel comprises a photodiode and a comparator comparing the voltage across the photodiode with a reference voltage. In such a sensor, during an image acquisition phase, each pixel is first reset by recharging of its photodiode to a reset voltage. The photodiode of each pixel is then isolated from the node of application of the reset voltage, and the voltage across the photodiode decreases according to the light intensity received by the pixel. When the voltage across the photodiode of a pixel reaches the reference voltage, the comparator output switches state. The pixel is said to turn on. The pixel then generates a pulse transmitted to a readout circuit external to the pixel. The address of the pixel having emitted the pulse is then determined by the readout circuit. The time of reading of the pixel address is stored and forms the pixel output value. The implementation of step 201 of 1-bit quantization of the output values of the pixels is then particularly simple to implement since it is sufficient to determine a reference time period defining the quantization threshold and to determine, for each pixel, whether the pixel has turned on or has not turned on at the end of the reference period. It should in particular be noted that the reference period may be common to all the image pixels or, in a preferred embodiment, be defined cell by cell or cell block by cell block, according to the turn-on time of the brightest pixel of the cell or of the block (which amounts to setting the quantization threshold of the pixels of the cell or of the block according to the maximum value of the cell or block pixels as described hereabove).

The provided descriptor generation method is particular adapted to an implementation in a time-domain coding image sensor of the type described in French patent application No. 15/53799 filed on Apr. 28, 2015 (inventor David Dehaene). In such a sensor, the pixels are distributed in blocks of a plurality of pixels. In each pixel block, a local control circuit is provided to, when the first pixel (that is, the brightest pixel) of the block turns on, inhibit all the block pixels for a predetermined inhibition period $T_{inh}$. During the inhibition period, the pixels in the block may turn on but outgoing requests are blocked. At the end of the inhibition period, a binary map of the block pixels is available. In other words, at the end of the inhibition period, a first binary value may be assigned to the pixels which are on, for example, value 1, and a second binary value may be assigned to the pixels which are still off, for example, value 0. A 1-bit quantization of the pixels of the block is then performed with a quantization threshold which is a function of the value of the brightest pixel in the block. Preferably, inhibition period $T_{inh}$ is selected block by block according to the turn-on time of the brightest pixel in the block.

In the case where the above-described descriptor generation method is implemented within the image sensor, an analysis system capable of being gradually awakened according to the variation of the characteristics of the scene may be provided. As an example, descriptors D are permanently generated, that is, for each image acquired by the sensor, within the sensor itself. A first analysis of the descriptors is implemented by the sensor itself to detect a possible remarkable event in the scene, for example, a movement. As an example, a local variation of the descriptor of a block 105 between two images successively acquired by the sensor may form such a remarkable event. To detect such a variation, the sensor may comprise inner storage means, for example, one specific storage circuit per block 105, enabling to store the descriptors of one or a plurality of previous images, or a piece of information linked to the descriptors, for example, the binary values of the pixels in the block or the orientation of the block in the previous images, during the phase of acquisition and processing of a current image. When a remarkable even is detected, the sensor orders the implementation of a general analysis of the image. Such a general analysis is for example implemented by a processing circuit external to the sensor. All the descriptors D generated by the sensor for the current image may then be transmitted to the external processing circuit for the implementation of the general analysis.

Such a mechanism of gradual awakening of the analysis system has the advantage of limiting data transfers between the sensor and the external processing circuits.

Specific embodiments have been described. Various alterations, modifications, and improvements will readily occur to those skilled in the art. In particular, the dimensions (number of pixels) of cells 103 and/or of cell blocks 105 may of course be different from the above-described examples.

Further, the binary data generated at step 201 may be used for other functions than the generation of descriptors D, for example, to detect movements by applying filters on a plurality of successive images. Morphological operations may further be applied to the binary data to highlight specific features.

Further, in an alternative embodiment of the above-described processing method, step 201 of binarizing the image pixel values may be omitted. In this case, the calculation of the gradient intensity values VG1, . . . VGn (step 203) is performed directly based on the non-binarized values of the image pixels.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of processing, by means of an electronic device, an image comprising a plurality of pixels distributed into one or a plurality of blocks each comprising a plurality of cells of a plurality of pixels, the method comprising the steps of:
   a) for each cell, calculating, for each of n different gradient orientations, where n is an integer greater than or equal to 2, a first gradient intensity value, each first gradient intensity value being a weighted sum of values of the pixels of the cell;
   b) for each cell, determining, based on the n first gradient intensity values calculated at step a), a main gradient orientation of the cell, and a second value representative of the intensity of the gradient in the main orientation; and
   c) for each block, generating a descriptor of n values respectively corresponding, for each of the n gradient orientations, to a sum of the second values of the cells of the block having the gradient orientation considered as the main gradient orientation.

2. The method of claim 1, wherein step a) comprises, for each cell, an initial step of 1-bit quantization of the values of the pixels of the cell, each first gradient intensity value being a weighted sum of the 1-bit quantized values of the pixels of the cell.

3. The method of claim 2, wherein, at step a), for each cell, during the initial step of 1-bit quantization of the values of the pixels of each cell, a specific quantization threshold is used for each cell or cell block of the image.

4. The method of claim 3, wherein, at step a), for each cell, the quantization threshold used during the initial step of 1-bit quantization of the values of the pixels of the cell is a function of the value of at least one pixel of the cell or of the block containing the cell.

5. The method of claim 4, wherein, at step a), for each cell, the quantization threshold used during the initial step of 1-bit quantization of the values of the pixels of the cell is a function of a value of a brightest pixel in the cell or in the block containing the cell.

6. The method of claim 1, wherein, at step a), weighting coefficients used to generate the n first intensity values of gradients having different orientations of each cell are binary coefficients.

7. The method of claim 1, wherein, at step a), weighting coefficients used to generate the n first intensity values of gradients having different orientations of each cell are non-binary coefficients.

8. The method of claim 1, wherein the n gradient orientations of step a) are separated two by two by a same angular distance.

9. The method of claim 1, wherein, at step b), the orientation for which the first gradient intensity value generated at step a) is maximum is selected as the main gradient orientation of the cell.

10. The method of claim 1, wherein step b) comprises:
a step of generation of a vector B resulting from a convolution operation between a vector A of dimension n formed by the n first gradient intensity values generated at step a) and a triangular signal; and
a step of selecting, as a main gradient orientation of the cell, the orientation for which the value of vector B is maximum.

11. The method of claim 1, wherein, at step b), the second value representative of the intensity of the gradient of the cell in the main gradient orientation of the cell is weighted by a coefficient which is a function of the distribution of the values of the pixels of the cell.

12. A system comprising:
an image sensor comprising a plurality of pixels distributed into one or a plurality of blocks each comprising a plurality of cells of a plurality of pixels; and
a processing circuit capable of implementing, for each image acquired by the sensor, the processing method of any of claim 1.

13. The system of claim 12, wherein the image sensor is a time-domain coding sensor where each pixel comprises a photodiode and a comparator comparing a voltage across the photodiode with a reference voltage, each pixel being capable, during a phase of acquisition of an image, of turning on and of generating a pulse when the voltage across its photo-diode reaches the reference voltage.

14. The system of claim 13, wherein the processing circuit comprises, for each block of pixels of the sensor, a circuit capable of, during a phase of acquisition of an image:
determining a time when a first pixel of the block turns on; and
after a predefined inhibition period starting from this time, determining which pixels of the block have turned on and which pixels of the block have not turned on during the predefined inhibition period.

* * * * *